United States Patent
Stephenson et al.

(10) Patent No.: US 10,653,061 B2
(45) Date of Patent: May 19, 2020

(54) METHOD AND APPARATUS FOR HARVESTING CROP MATERIAL

(71) Applicant: Deere & Company, Moline, IL (US)

(72) Inventors: Roger D. Stephenson, Ottumwa, IA (US); Allan W. Rosenbalm, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 317 days.

(21) Appl. No.: 14/792,907

(22) Filed: Jul. 7, 2015

(65) Prior Publication Data

US 2017/0006773 A1 Jan. 12, 2017

(51) Int. Cl.
| | | |
|---|---|---|
| *A01D 43/00* | (2006.01) | |
| *A01D 34/53* | (2006.01) | |
| *A01D 82/02* | (2006.01) | |
| *A01D 34/66* | (2006.01) | |

(52) U.S. Cl.
CPC ........... *A01D 34/53* (2013.01); *A01D 34/664* (2013.01); *A01D 82/02* (2013.01)

(58) Field of Classification Search
CPC ................................ A01D 82/00; A01D 82/02
USPC ..... 56/57, 16.4 R, 16.4 B, 16.4 C, 255, 256, 56/295, 320.1, 320.2
See application file for complete search history.

(56) References Cited

U.S. PATENT DOCUMENTS

| | | | |
|---|---|---|---|
| 2,760,326 A | 8/1956 | Smith | |
| 3,479,805 A | 11/1969 | Soteropulos | |
| 3,503,190 A | 3/1970 | Van Der Lely | |
| 3,624,987 A | 12/1971 | Lausch et al. | |
| 4,055,037 A | 10/1977 | Oosterling et al. | |
| 4,182,099 A | 1/1980 | Davis et al. | |
| 4,187,664 A * | 2/1980 | Meek | A01D 43/107 56/13.6 |
| 4,300,333 A | 11/1981 | Anderson | |
| 4,330,982 A | 5/1982 | Vissers et al. | |
| 4,499,712 A | 2/1985 | Klinner | |
| 4,739,609 A | 4/1988 | Meier et al. | |
| 5,157,904 A * | 10/1992 | Otten | A01D 45/10 56/14.3 |
| 5,191,759 A * | 3/1993 | Baker | A01D 45/10 56/500 |

(Continued)

FOREIGN PATENT DOCUMENTS

RU 2323564 C2 5/2008

*Primary Examiner* — Thomas B Will
*Assistant Examiner* — Mai T Nguyen
(74) *Attorney, Agent, or Firm* — Taft Stettinius & Hollister LLP; Stephen F. Rost (57) ABSTRACT

A crop harvesting machine configured to move cut crop positively across a cutterbar and toward a conditioner element using an undershot rotating element or undershot auger. The crop harvesting machine includes a cutterbar having a plurality of rotary cutters having rotational axis aligned along a line transverse to a moving direction of the crop harvesting machine. The undershot rotating element is subtended by portions of the rotary cutters and is located between rotational axis lines of the rotating cutters and an exit of the crop harvesting machine. The undershot rotating element moves cut crop between the undershot rotating element and the plurality of rotary cutters and to a conditioner element which conditions the cut crop for placement of the conditioned cut crop in swaths on a field.

15 Claims, 9 Drawing Sheets

(56) References Cited

U.S. PATENT DOCUMENTS

| | | | |
|---|---|---|---|
| 5,421,145 A * | 6/1995 | Pruitt | A01D 34/668 |
| | | | 56/13.6 |
| 5,845,469 A | 12/1998 | Koorn | |
| 5,980,383 A | 11/1999 | Medley | |
| 6,073,431 A | 6/2000 | Osborne et al. | |
| 6,158,201 A | 12/2000 | Pruitt et al. | |
| 7,621,113 B2 | 11/2009 | Blakeslee et al. | |
| 7,644,566 B2 | 1/2010 | Diederich, Jr. et al. | |
| 7,726,108 B1 | 6/2010 | Pruitt et al. | |
| 8,006,469 B2 | 8/2011 | Barnett | |
| 8,015,784 B2 | 9/2011 | Barnett et al. | |
| 8,230,668 B2 * | 7/2012 | Hinds | A01D 45/10 |
| | | | 56/53 |
| 8,291,685 B2 | 10/2012 | Pruit et al. | |
| 8,297,033 B2 | 10/2012 | Pruit et al. | |
| 8,601,778 B2 | 12/2013 | Pruitt et al. | |
| 2005/0126147 A1* | 6/2005 | Nickel | A01D 43/102 |
| | | | 56/16.4 B |
| 2008/0256920 A1 | 10/2008 | Yanks | |
| 2010/0269475 A1 | 10/2010 | Barnett et al. | |
| 2012/0011819 A1 | 1/2012 | Olander et al. | |
| 2012/0011820 A1 | 1/2012 | Olander et al. | |
| 2012/0174553 A1 | 7/2012 | Pruitt et al. | |
| 2014/0144116 A1 | 5/2014 | Kraus | |

\* cited by examiner

METHOD AND APPARATUS FOR HARVESTING CROP MATERIAL

FIELD OF THE DISCLOSURE

The present invention relates to a mower configured to cut crop material, and more particularly to a crop harvesting machine configured to move cut crop positively across a rotary cutterbar.

BACKGROUND

Agricultural equipment, such as a tractor or a self-propelled windrower, includes a prime mover which generates power to perform work. In the case of a tractor, for instance, the prime mover is often a diesel engine that generates power from a supply of diesel fuel. The diesel engine drives a transmission which moves wheels or treads to propel the tractor across a field. In addition to providing power to wheels through a transmission, tractors often include a power takeoff (PTO) which includes a shaft coupled to the transmission and driven by the engine.

In different embodiments, the mower conditioner is a separable machine which is configured to be attached to and detached from a tractor, which either pushes the mower conditioner or pulls the mower conditioner. In the separable mower conditioner, the mower conditioner is removably coupled to the tractor and is readily moved from one tractor to another if desired. In these embodiments, the mower conditioner is powered by the PTO of the tractor or a hydraulic motor system thereof.

In another embodiment, the mower conditioner is configured as part of the vehicle and is generally known as a windrower. In the windrower configuration, the mower conditioner is configured as a machine substantially integral with a tractor, such that the mower conditioner is not readily moved from one tractor to another, but instead both the tractor and mower conditioner are integrally designed. In a windrower, the mower conditioner is powered by the prime mover, the PTO, or a hydraulic system including a hydraulic motor.

Mower-conditioners typically operate at a ground speed of from five to ten miles per hour (mph). When the vehicle is operated at this speed, crop moves across a cutterbar, flows past one or more augers, where the crop is transferred to a conditioner, and then expelled out the rear of the mower-conditioner to form a windrow. The uniformity of the formed windrow density (defined as quantity of crop per unit volume) depends not only on the features and function of the mower conditioner, but also on the type and condition of the crop being cut. For instance, cut crop can be light, heavy, sparse, thick, and of variable moisture content.

In some mower conditioner operations, the cut crop hesitates above the cutterbar, resulting in poor cut quality, recut crop, and non-uniform feeding into a conditioner element. When the crop is cut at the front edge of the cutterbar, the crop has some momentum from the cutting action moving it laterally and to the rear with the movement of a rotary cutter disk and rotary knife attached thereto. Rearward momentum of the cut crop is further aided by contact with the uncut crop, prior to being cut, and the relative forward movement of the machine.

In some machines, once the crop is cut, movement of the crop toward the back of the mower conditioner is aided by movement of the rotary disk of the rotary cutter and rotary cutting knives coupled to the rotary disk. The cut crop proceeds with the aid of the rotary cutter, in a direction for delivery to a converging element, a conditioner element or both. Oftentimes, however, in light crop conditions, cut crop can be captured momentarily by the trailing side of the rotary cutter and thrown forward, instead of rearward toward the conditioner element as desired. This thrown crop can push down uncut crop causing cut quality issues. Also, the cut crop can remain for a short period of time, or hesitate, on top of the rotary cutter, before moving toward and into the conditioner. Cut crop which hesitates on the top of the rotary cutter, can be damaged from recutting during the hesitation, as well as from non-uniform feeding to the conditioner. Consequently, what is needed is a mower conditioner which reduces the amount of recutting and non-uniform feeding.

SUMMARY

In one embodiment, there is provided a crop harvesting machine configured to cut crop material and to transfer the cut crop material. The crop harvesting machine includes a cutterbar supported by a frame, wherein the cutterbar includes a plurality of rotary cutters disposed along an axis which is transverse to a forward working direction of the crop harvesting machine. An undershot rotating element is supported by the frame for rotation about a rotational axis, wherein the rotational axis of the undershot rotating element is located above at least a portion of the cutterbar. The rotating element is configured to rotate about the rotational axis to move cut crop material between the undershot rotating element and the plurality of rotary cutters.

In another embodiment, there is provided a method of cutting and conditioning a crop and for returning the cut and conditioned crop to a field in a swath. The method includes providing a crop harvesting machine having: i) an input and an output, the input configured to receive a crop and the output configured to deliver a conditioned cut crop to the field; ii) a cutterbar including a plurality of rotary cutters defining a front cutting edge located toward the input and a trailing edge displaced from the front cutting edge; ii) an undershot rotating element having a rotational axis located above at least a portion of the plurality of rotary cutters; and iii) a rotary conditioner element disposed between the rear edge and the output; cutting the crop with the rotary cutters; delivering the cut crop to an area located between the undershot rotating element and the plurality of rotary cutters; rotating the undershot rotating element in a first direction to move the cut crop into contact with the plurality of rotary cutters; rotating the rotating conditioner element in a second direction opposite to the first direction of the undershot rotating element to condition the cut crop; and depositing the conditioned cut crop to the field in a swath.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
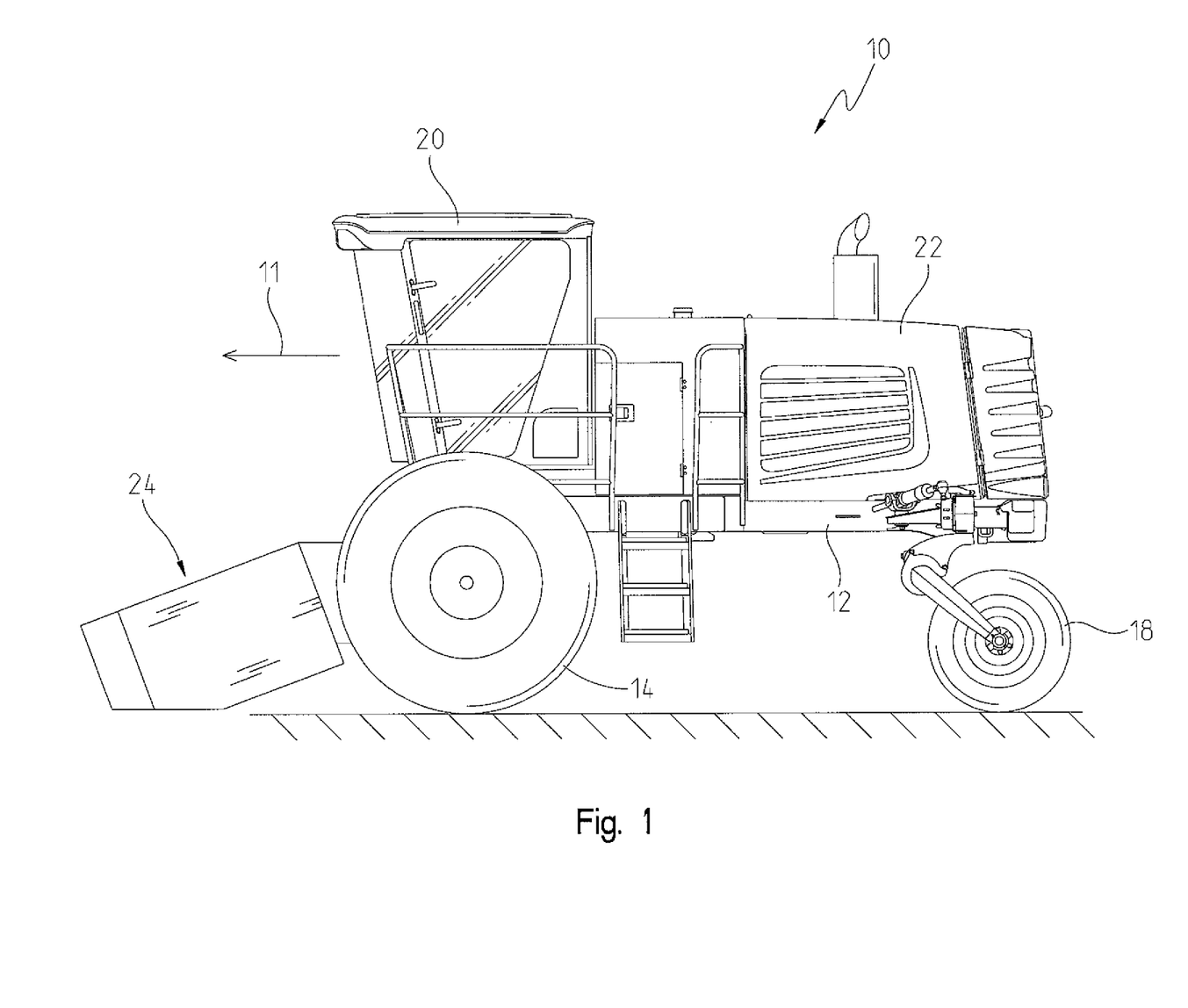
FIG. 1 is a side elevational view of a windrower including a tractor coupled to a mower conditioner.

FIG. 1 is a side elevational view a self-propelled crop harvesting machine 10 operable to cut and collect standing crop in a field, condition the cut crop as it moves through a mower conditioner machine to improve its drying characteristics, and then return the cut and conditioned crop material to the field in a windrow or swath. The crop harvesting machine is also known as a mower conditioner or a windrower. The crop harvesting machine 10 moves along the field in a working direction 11. The crop harvesting machine 10 includes a main frame 12 supported on driven right and left front wheels, of which only the left front wheel 14 (with respect to the operator) is shown and on right and left caster mounted rear wheels, of which only a left rear wheel 18 is shown. Carried on a forward end region of the frame 12 is a cab 20. Mounted on the frame 12 behind the cab 20 is a housing 22 within which is located a prime mover (not shown), such as an internal combustion engine. A harvesting header 24 is coupled to and supported by the forward end of the frame 12. Operator controls (not shown) are provided in the cab 20 for operation of the crop harvesting machine 10, including the attached harvesting header 24. The harvesting header, in one embodiment, includes one or more ground engaging devices, such as one or more skid shoes or wheels (not shown), to support the harvesting header 24 during movement across a field. In one embodiment, the harvesting header does not include a traction drive. All of its power comes from the windrower traction unit or the tractor.

Figure 2:
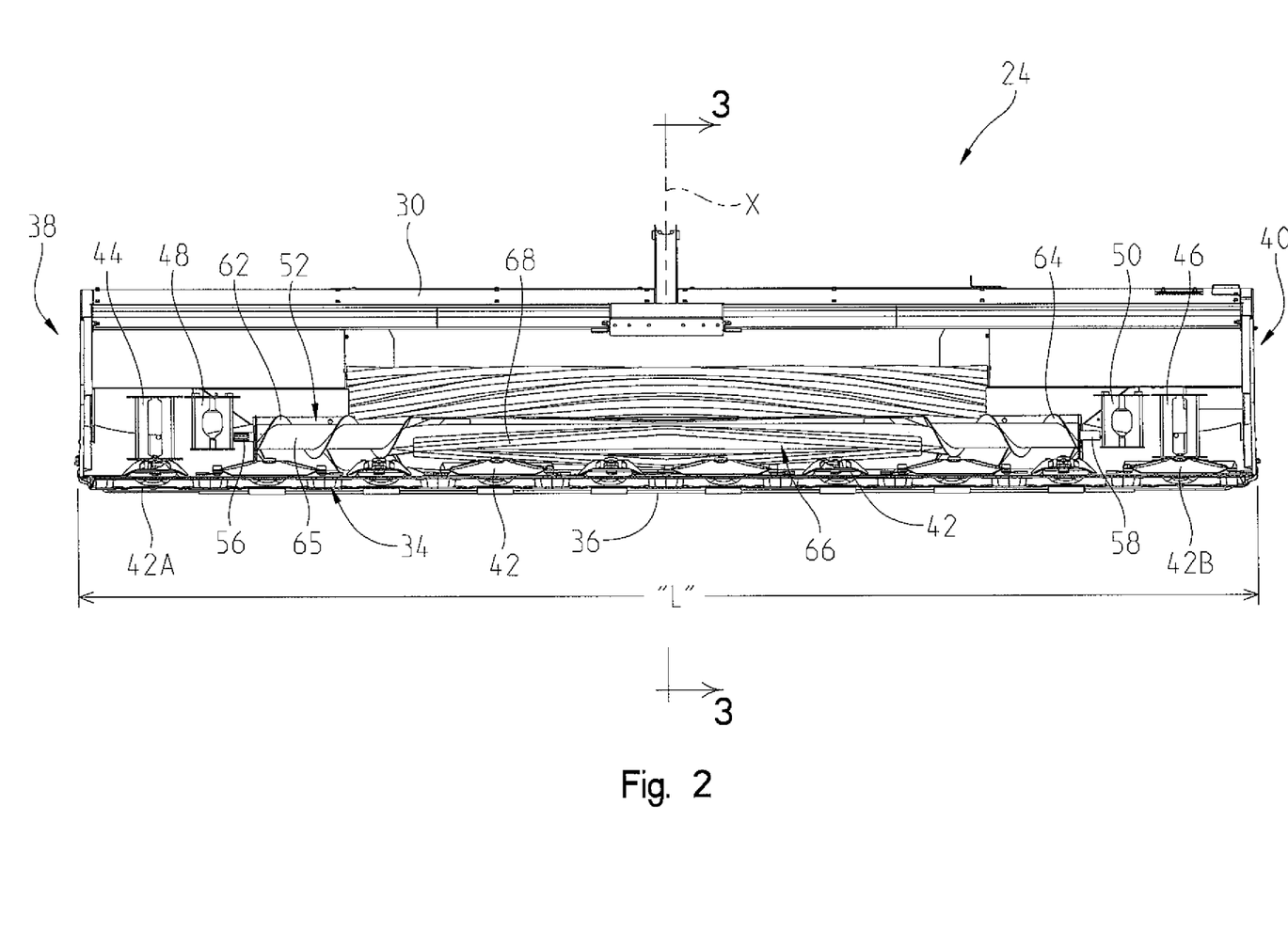
FIG. 2 is a front elevational view of a crop harvesting machine.

FIG. 2 is an elevational front view of the harvesting header 24. In this view, the harvesting header 24 includes a frame 30 to which crop cutting and conditioner elements are attached. As illustrated, the harvesting header extends along a length "L" which defines a crop cutting width provided by a cutterbar 34. The cutterbar 34 is transverse with respect to the moving direction 11 of the windrower 10 of FIG. 1. In one embodiment, the cutterbar 34 is aligned substantially perpendicularly to the moving direction 11 of the windrower 10. In other embodiments having a separable mower conditioner, the mower conditioner is either pushed or pulled by a tractor such that the cutterbar is operated generally perpendicularly to the direction of travel and either parallel to the ground or with the front edge of the cutterbar tipped lower than the back edge. Consequently, the length L, defined by the cutterbar, defines a line generally perpendicular to the direction of travel 11, such that the cutterbar, in different embodiment, operates with a fore-aft tilt or substantially no fore-aft tilt. Windrowers and mowers include such configurations.

The cutterbar 34 includes a substantially planar support member 36 which extends from a first side 38 of the frame 30 to a second side 40 of the frame 30. The support member 36 is configured to support a plurality of rotary cutters 42, each of which is supported by the support member 36 for rotation about respective centers each defining a rotational axis substantially perpendicular to the length L. The plurality of rotary cutters 42 define a rotary cutter zone which extend longitudinally along the cutter bar in which crop is cut and cut crop moves across the rotary cutters. At one end of the cutterbar 34 toward the first side 38, a first converging drum 44 is located above a rotary cutter 42A. A second converging drum 46 is located above a rotary cutter 42B. Each of the first and second converging drums 44 and 46 are operatively connected to the respective rotary cutters 42A and 42B, such that the first and second converging drums move in the same rotational directions as the respective rotary cutter 42A and 42B. The rotary cutters 42 are arranged along the length of the support member 36 such that the rotary cutters 42 located leftward of a center line X, as illustrated, are driven in a counterclockwise direction when viewed from above and the rotary cutters 42 located rightward of the center line X are driven in a clockwise direction when viewed from above. See FIG. 6.

Figure 6:
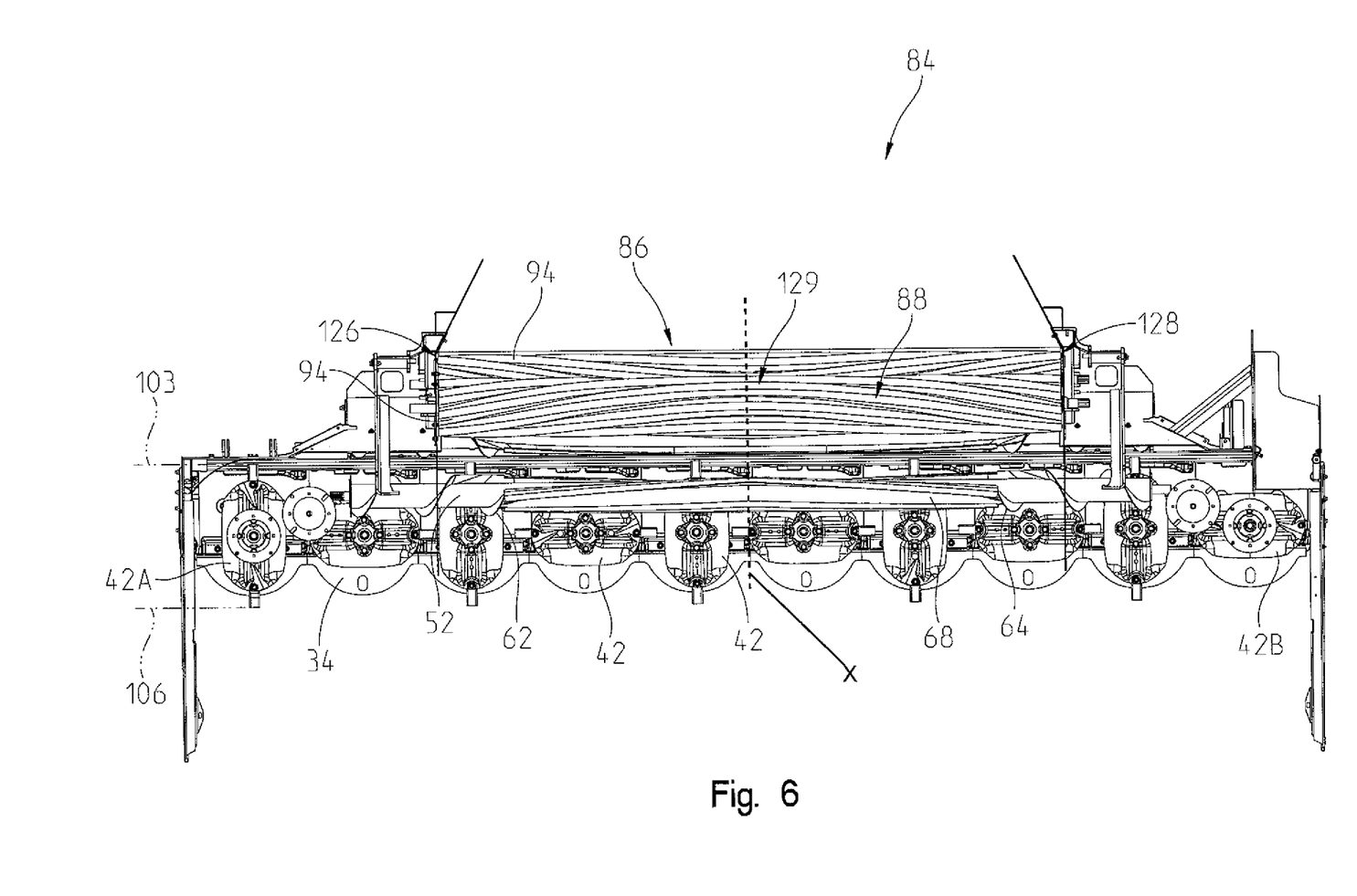
FIG. 6 is a top plan view of a crop harvesting machine.

In one embodiment, the rotational direction of the cutters is generally toward the center with the front edge of the cutterbar such that the cutters located on the left-hand side of the drawing (the right-hand side of the cutterbar in the direction of operation) is counterclockwise. The rotational direction of the cutters on the right-hand side of FIG. 6 is clockwise. In other embodiments, the cutters located inboard of either the conditioner or the converging means are configured to rotate as pairs. As seen in FIG. 6, the outer two cutters on each end of the cutterbar rotate toward center, but the remaining cutters, in other embodiments, rotate as counter-rotating pairs.

A third converging drum 48 is located adjacently to the converging drum 44 and rotates in the same direction as the converging drum 44. A fourth converging drum 50 is located adjacently to the converging drum 46 and rotates in the same direction as the converging drum 46. Each of the converging drums 48 and 50 are driven by a belt (not shown) which operatively couples each drum 48 and 50 to adjacent drums 44 and 46. The converging drums 48 and 50 are smaller than the converging drums 44 and 46. Due to the rotation of the converging drums, crop cut toward the sides 38 and 40 is directed toward the centerline X.

Figure 3:
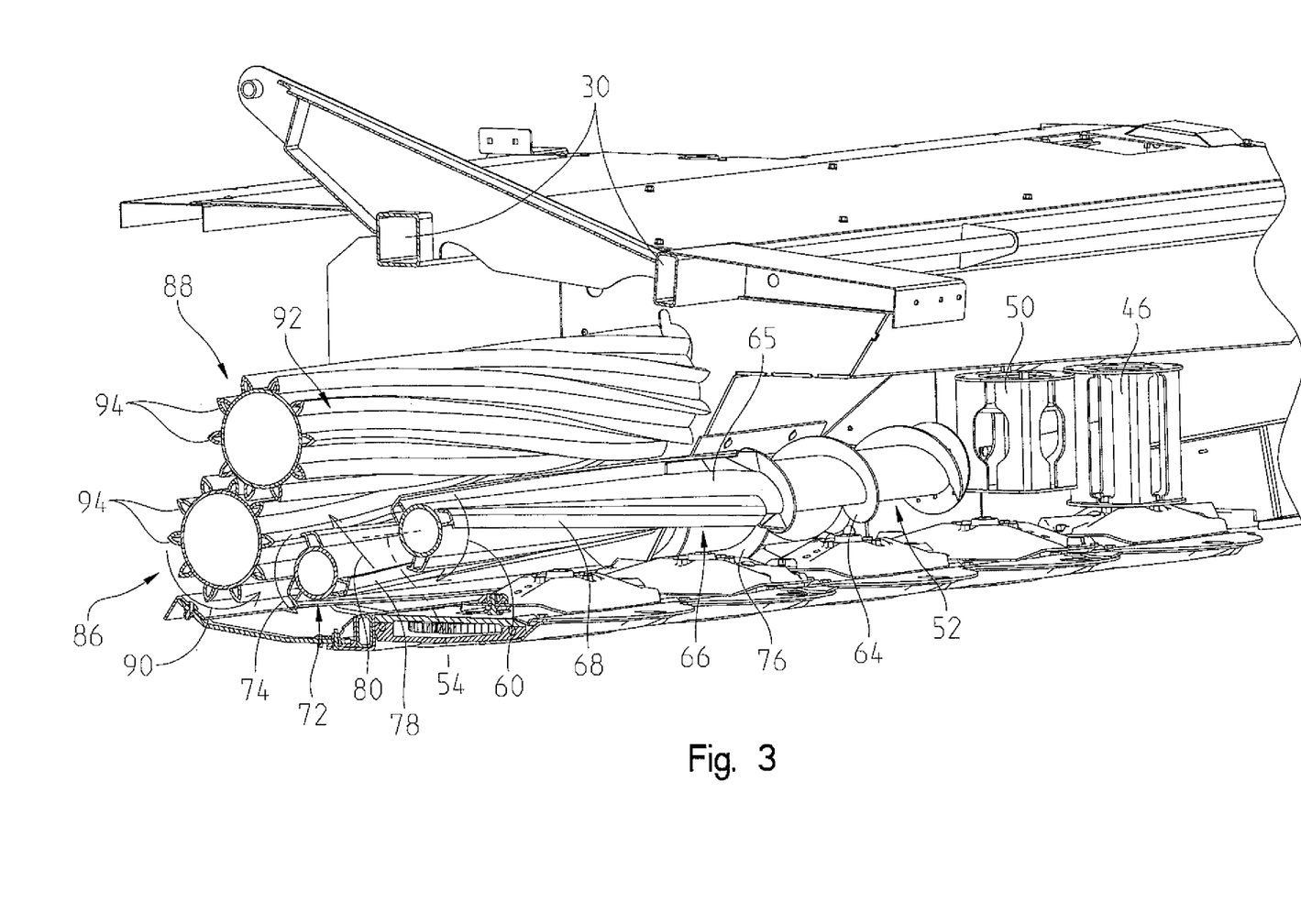
FIG. 3 is a partial perspective view of a crop harvesting machine taken along the line 3-3 of FIG. 2.

An undershot rotating element 52 is supported by the frame 30 for rotational movement about a rotational axis 54. See FIG. 3. The undershot rotating element 52 includes a length which extends along the longitudinal direction and between the converging drum 48 and 50. As illustrated, a first end 56 and a second end 58 are supported for rotation about the rotational axis 54 in a rotational direction 60 as illustrated in FIG. 3. Located adjacently to the first end 56 is a first flighting 62 and located adjacently to the second end 58 is a second fighting 64. The flightings extend from and are coupled to a cylindrical portion 65. The flightings 62 and 64 are arranged to move cut crop toward the centerline X and to a paddle section 66. The auger fighting moves cut crop toward the center of the machine. The paddle section 66 includes a plurality of paddles 68 each of which extends from and is coupled to the cylindrical portion 65. The paddles 68 extend between each of the first fighting 62 and the second fighting 64. The paddles 68 include a curved profile with respect to the rotational axis 54 and having end portions disposed adjacently to the first flighting 62 and second fighting 64 to contact cut crop. The paddles are located in key areas where the predominant direction of motion of the rotary cutters is to the front of the header 24. The paddles are configured to move the cut crop to the rear of the machine, with little movement of the crop towards the center of the paddles. The curve profile of the paddles reduces or substantially eliminates power spikes which could occur if the paddles were not curved, but were instead straight across. Cut crop, therefore, is moved away from the converging drums 48 and 50 toward the centerline X by the flightings 62 and 64 where it is pushed toward the rear of the rotary cutters 42 by paddles 68 and toward an overshot rotating element 72 of FIG. 3. As used herein, terms undershot and overshot rotating elements can also be identified as overshot augers or undershot augers when having the included flightings which are configured to move cut crop in a fashion similar to an auger.

The overshot rotating element 72 is supported by the frame 30 for rotational movement in a direction 74 which is opposite the rotational direction 60 of the undershot rotating element 52. In one embodiment and as illustrated in FIG. 3, the overshot rotating element 72 includes crop movement features of the same type as the undershot rotating element 52. The overshot rotating element 72, therefore includes first and second flightings, one of which, fighting 76, is shown. A paddle section 78 is disposed between the first and second fighting. The opposed rotations of undershot rotating element 52 and overshot rotating element 72 move the cut crop between the two augers 52 and 72 along a path 80. See also FIG. 4. The path 80 extends toward an interface 82 located at a conditioner element 84, which in the illustrated embodiment includes a first conditioner roll 86 and a second conditioner roll 88.

Figure 4:
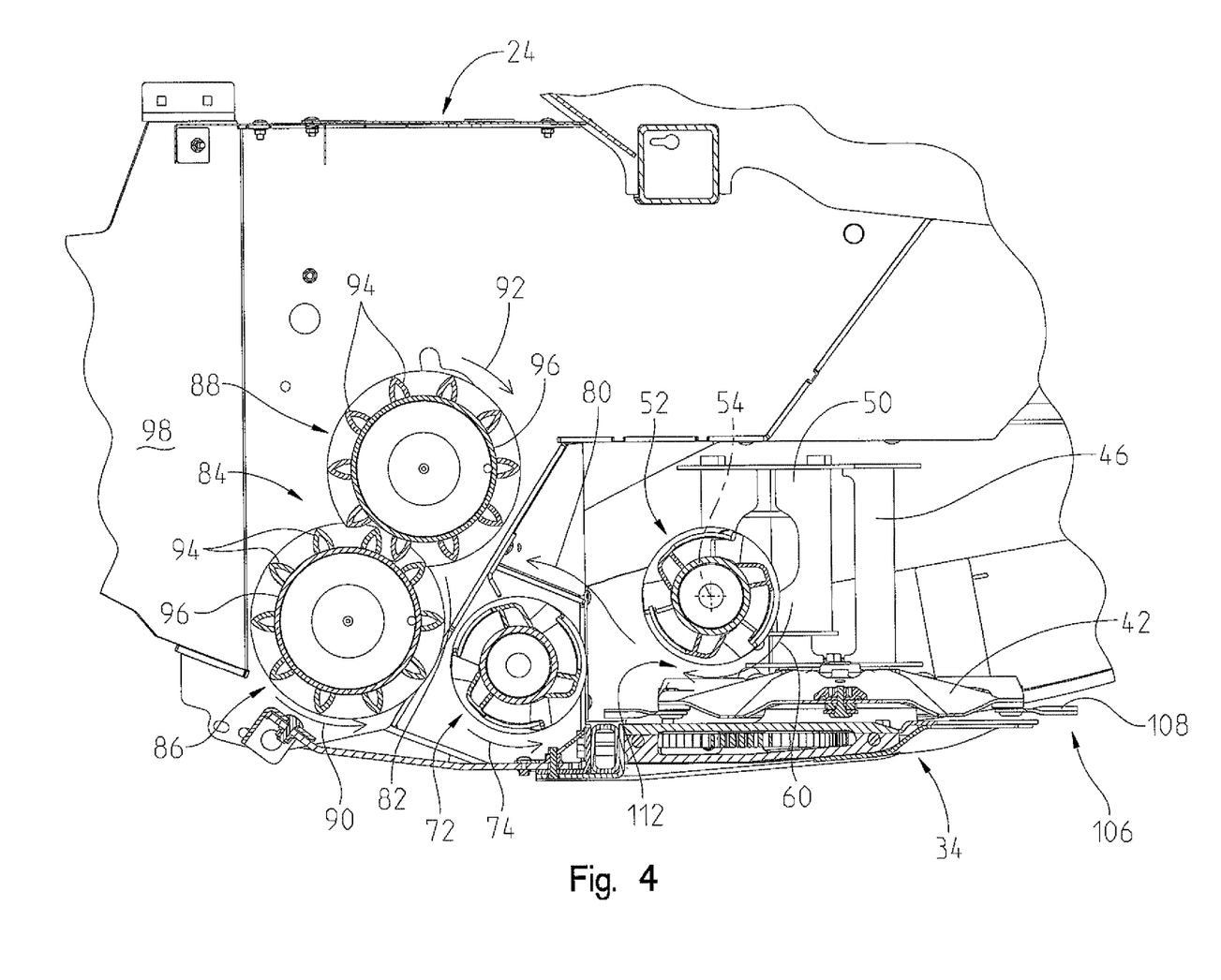
FIG. 4 is a side elevational view of the partial perspective view of FIG. 3.

The first conditioner roll 86 moves in a direction 90 which is opposite a direction 92 of the second conditioner roll 88. Each of the conditioner rolls 86 and 88 include a plurality of extensions or splines 94 extending from a cylindrical portion 96. The splines 94 of one roll 86 mesh with the splines 94 of the other roll 88 such that the cut crop moving along the path 80 and into the interface 82 is conditioned by pressing, crushing, or breaking the cut crop to reduce the rigidity of the cut crop, as well as to remove or at least release a waxy outer layer which can be found in the cut crop depending on the type of cut crop being conditioned. After cutting, the crop is conditioned by passing between the roll 86 and the roll 88 and out a back portion 98 of the mower conditioner 24. The cut crop then moves to the field where it remains until use or collection.

Figure 5:
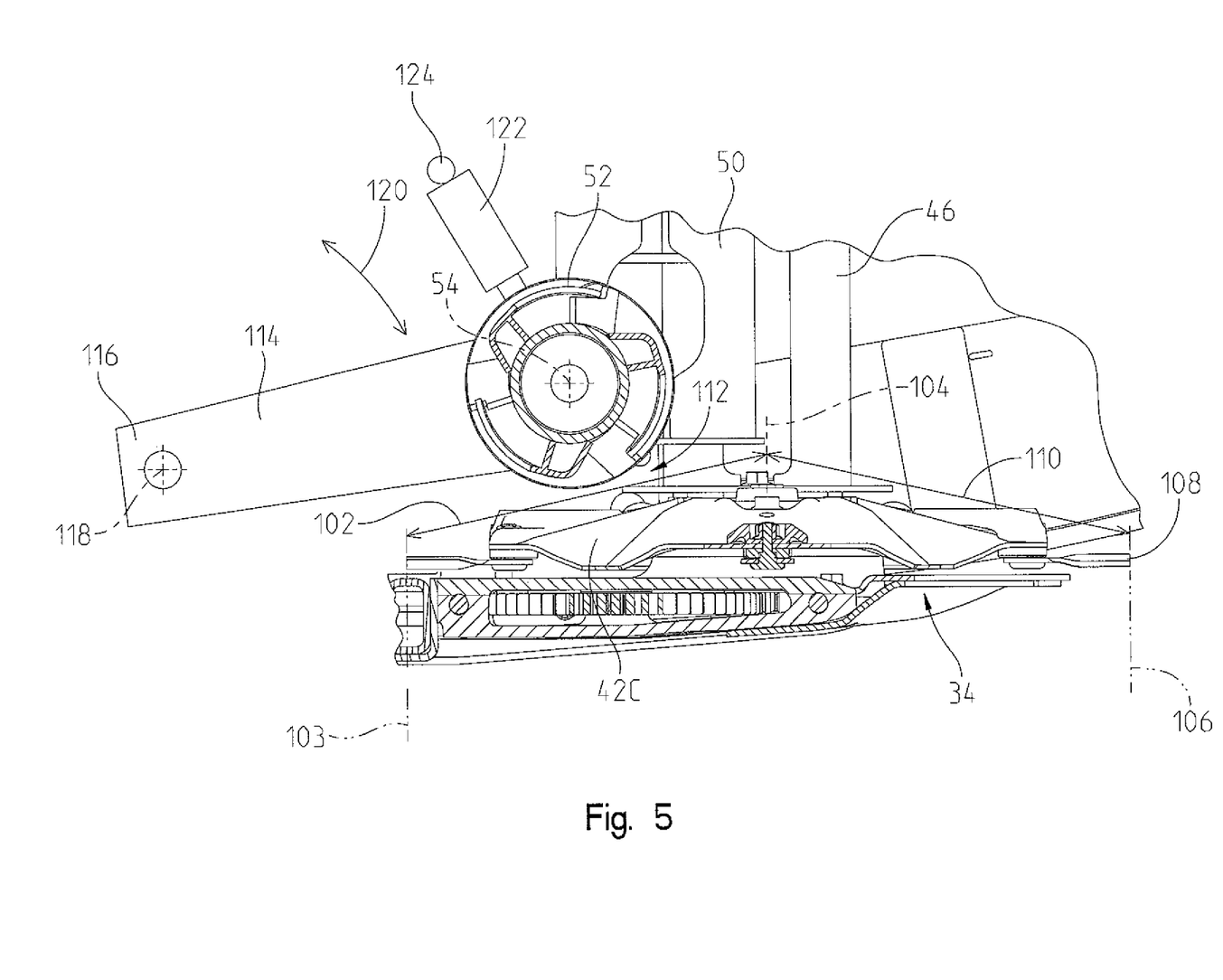
FIG. 5 is a side elevational view of another embodiment.

As can be seen in FIGS. 4 and 5, the undershot rotating element 52 is supported above at least a portion of the cutterbar 34 and is generally subtended by the plurality of rotary cutters 42, one of which, rotary cutter 42C, is shown. The cutterbar 34, therefore, underlies the plurality of rotating elements 52. In one embodiment as illustrated, a rotational axis 54 of the undershot rotating element 52 extends along the length of the cutterbar 34 and is generally disposed along and above a trailing portion 102 of the line of rotary cutters 42. As can be seen, the trailing portion 102 extends from a rotational axis 104 of the illustrated rotary cutter 42C to a trailing edge 103 of the cutter 42C along an incline defined by the rotary cutter. In other embodiments, the rotational axis 54 of the undershot rotating element 52 is disposed substantially directly above the rotational axis 104, disposed substantially above the trailing edge 103, or positioned at a location therebetween.

Placement of the rotational axis 54 above the trailing edge 103 places the flightings 62 and 64 and the paddle section 66 above the trailing edge 103 of each of the rotary cutters 42 which, in one embodiment, are transverse to the moving direction 11. In other embodiments, the position is generally aligned perpendicularly to the moving direction 11. The cut crop, which is cut at a leading edge 106, defined by a plurality of rotary cutter knives 108, moves across a leading portion 110 of the rotary cutters 42 and falls to the exposed surfaces of the rotary cutters 42 of both the leading portion 110 and a part of the trailing portion 102, depending on the location of the undershot rotating element 52. Crop moves from an input of the harvesting header 24 at the leading portion and exits though an output located after the conditioner element 84 at the back portion 98.

The cut crop is moved by rotation 60 of the rotating element 52 into a space 112 defined between the outer edges of the flightings 62 and 64 and the paddle section 66 of the rotating element 52 and the rotary cutters 42.

In the embodiment of FIG. 4, this space is approximately 1.2 inches and remains substantially fixed along the length of the rotating element 52. The auger flight diameter is slightly larger than the paddle diameter, so this dimension of approximately 1.2 inches is slightly greater in the area of the paddles than under the flights. Each of the ends of the rotating element 52 is operatively connected to the frame 30 for rotation about the rotational axis 54. In FIG. 4, the rotational axis 54 does not move with respect to the cutterbar 34 since the ends of the rotating element 52 are fixedly located for rotation at the frame 30.

In another embodiment of FIG. 5, each end of the rotating element 52 is fixed to an arm, one of which is shown as arm 114 FIG. 5. Other types of linkages are used in different embodiments. A first end 116 of the arm 114 is rotatably coupled to the frame at a pivot location 118 about which the arm rotates in either a clockwise or counterclockwise direction 120. The arms 114, and therefore the rotating element 52, "floats" above, or moves with respect to an amount of the cut crop located between the undershot rotating element 52 and the rotary cutters 42. Consequently, while the rotating element 52 fixedly rotates about the axis 54, the axis 54 moves along an arc defined by the direction 120. Floating of the rotating element 52 provides additional clearance for heavy crop conditions. In FIG. 5, movement of the arm 114 is dampened in both directions 120 by a resilient element 122, such as a double acting hydraulic actuator, having one end coupled to one end of the arm or one end of the rotating element 52 and an end 124 fixed to the frame. The resilient element 122 dampens movement of the rotating element 52 which moves away from the cutterbar 34 if the amount of cut crop moving between the rotary cutters 42 and rotating element 52 increases sufficiently to cause movement of the rotating element 52 away from the rotary cutters. In one embodiment, the distance between the rotating element 52 and the rotary cutters 42 of FIG. 5, when the rotating element 52 is at a resting position, is the same distance between the rotating element 52 and rotary cutters 42 defining the space 112 in FIG. 4. In other embodiments, however, the distance between the rotating element 52 and the rotary cutters 42 defining the space 112 is different, since rotating element 52 is supported by the arm 114 for movement with respect to the rotary cutters 42.

In other embodiments, the resilient element 122 restricts movement of the rotating element 52 away from the rotary cutters 42, while only the weight of the rotating element 52 moves the rotating element toward the rotary cutters 42. In this embodiment, a single acting hydraulic actuator is used. In other embodiments, the resilient element 122 includes elastic springs, mechanical springs or gas springs. In still other embodiments, the resilient element is located at or near the pivot location 118.

As described herein, the placement of the undershot rotating element 52 with respect to the cutterbar 34, and in particular to the rotational axis of the rotary cutters 42, positively moves the crop across the rotary cutters 42 and to the conditioner element 84. The location of the auger at the trailing edges of the rotary cutters provides a positive directional movement of the cut crop instead of allowing it to hesitate on the top of the rotary cutters 42. Additional crop directional control devices, such as curtains or drapes to direct the cut crop, are therefore unnecessary. Consequently, not only is the cost of the crop directional control devices avoided, but clogging issues associated with such devices is avoided as well.

FIG. 6 illustrates a top plan view of the cutterbar 34, rotary cutters 42, the undershot rotating element 52, and the conditioner element 84. As can be seen, the splines 94 of each of the conditioner rolls 86 and 88 extends along the length thereof a distance which is greater that the distance spanned by the paddles 68 of the undershot rotating element. The length of the splines 94 extends longer than the length of the paddles 68 such that the ends of splines 94 terminate at a first location 126 and a second location 128. Consequently, cut crop, which is not sufficiently moved by the flightings 62 and 64 toward the center of the undershot rotating element, is still moved into the conditioner element 84 for conditioning. As seen in FIG. 6, the splines 94 are curvilinear, wherein the outer ends of the splines 94 lead the center section of the splines 94 in the direction of rotation. In another embodiment, the center section of the splines 94 leads the ends in the direction of rotation.

In FIG. 6, rotary cutters 42 are shown in one stationary position to illustrate that every other rotary cutter 42 is aligned at an angle of approximately ninety degrees with respect to an adjacent rotary cutter 42. As seen in FIG. 6, the trailing edge 103, as also seen in FIG. 5, is determined by the rotary cutter knife 108 at its full extension away from the rotary cutters 42.

Figure 7:
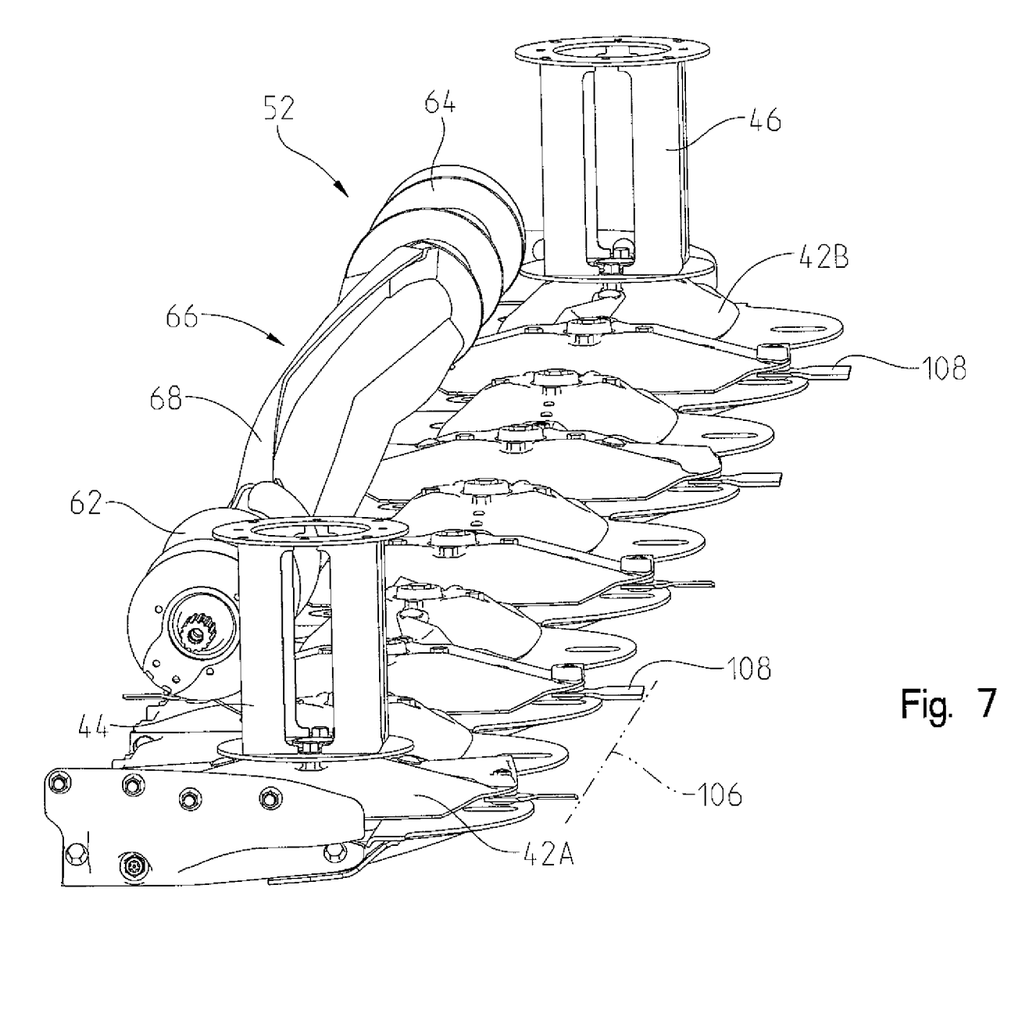
FIG. 7 is a perspective view of a cutterbar, an undershot rotating element, and first and second converging drums.

FIG. 7 illustrates a perspective view of the undershot rotating element 52 disposed above the rotary cutters 42 supported by the cutterbar support 36 and converging drums 44 and 46 of FIG. 2. In this embodiment, however, the converging drums 48 and 50 are not included. A drive mechanism (not shown) extends through the converging drums 44 and 46 to move the rotary cutters 42A and 42B. In other embodiments, the converging drums 44 and 46 are not included and are not required for operation of the undershot rotating element 52.

Figure 8:
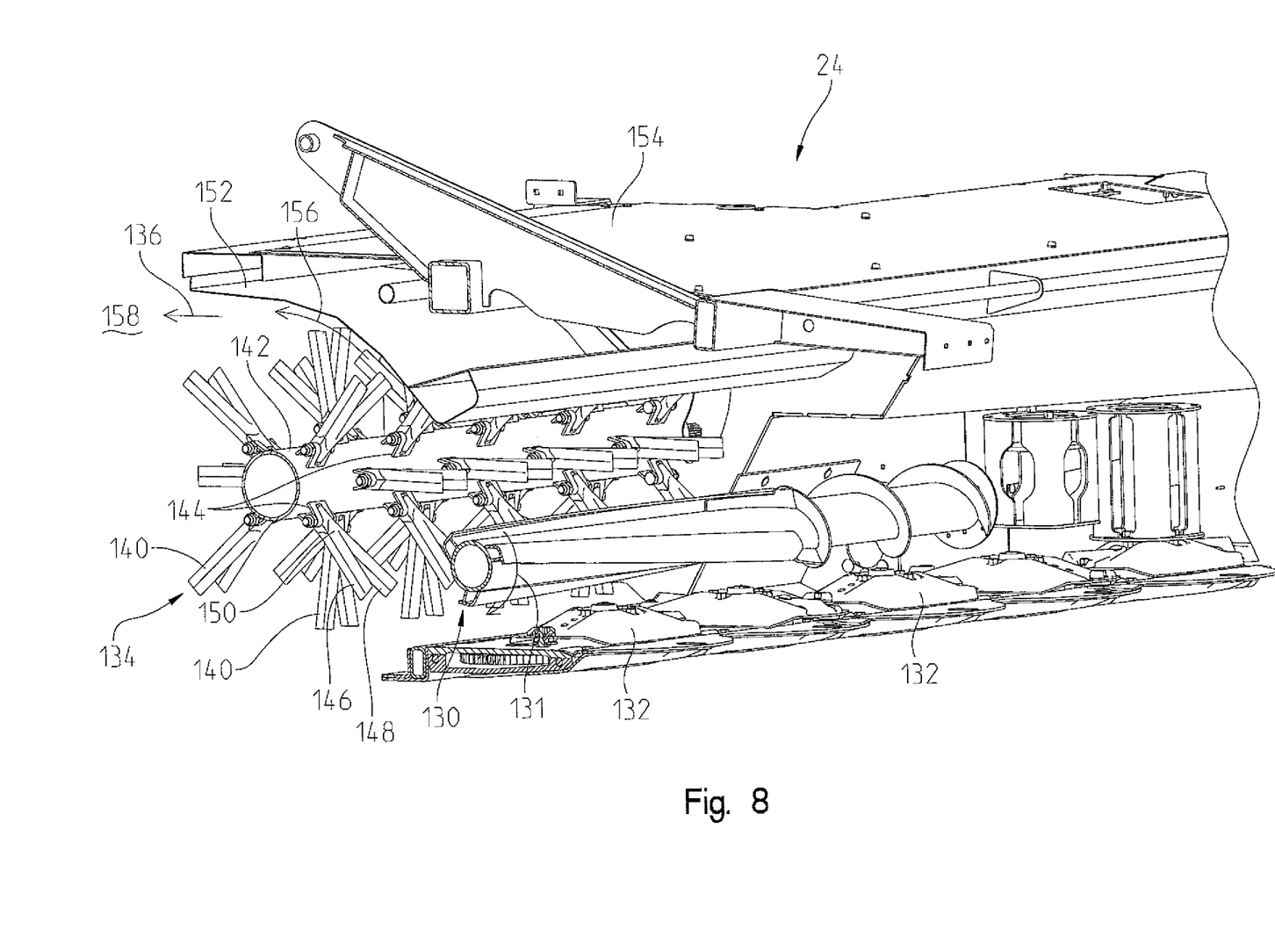
FIG. 8 is partial perspective view of another embodiment of a crop harvesting machine.
Figure 9:
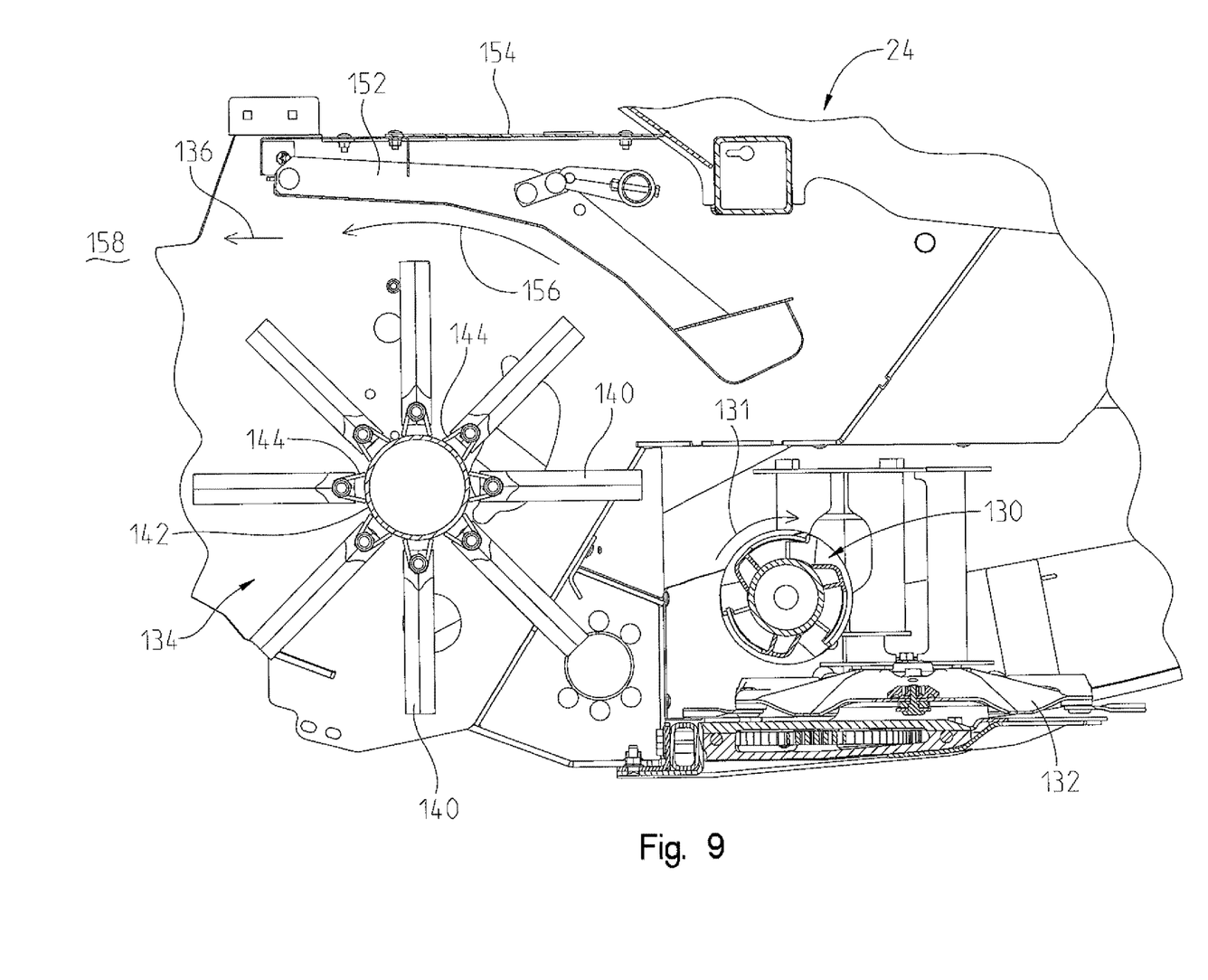
FIG. 9 is a side elevational view of the partial perspective view of FIG. 8.

FIGS. 8 and 9 illustrate another embodiment of the present disclosure including an undershot rotating element 130, rotating in a clockwise direction 131 as illustrated, located above at least a portion of, or subtended by, a plurality of rotary cutters 132. The undershot rotating element 130 is subtended by a trailing edge of the rotary cutters 132, which has been previously described with respect to other embodiments. In this embodiment, the overshot rotating element 72 of FIG. 4 is not included and an impeller conditioner 134 is used instead of the conditioner element 84 of FIG. 4. The impeller conditioner 134 rotates in a counterclockwise direction 136 and conditions cut crop which is received after being directed between the undershot rotating element 130 and the rotary cutters 132 of the harvesting header 24.

The impeller conditioner 134 includes a plurality of projecting elements or tines 140 which extend from a cylinder 142. Each of the tines 140 are coupled to the cylinder 142 at a plurality of brackets 144 extending from the cylinder 142. The tines 140 include a Y shaped configuration having a first leg 146 and a second leg 148 extending from a central portion 150 coupled to the bracket 144. The Y-shaped tine 140 is loosely coupled to the bracket 144 such that rotation of the cylinder 142 causes the tines to flail against the cut crop to condition the crop.

The harvesting header 24 includes shield 152 supported by a housing 154 and/or frame (not shown). The shield 152 is spaced from ends of the first leg 146 and second leg 148 to provide a passage 156 for the cut crop which is moved by the undershot rotating element 130 toward the impeller conditioner 134 and upwardly toward the exposed surface of the shield 152. Contact of the tines 140 with the cut crop moving though the passage 156 forces the cut crop toward the shield 152 such that the cut crop is conditioned by movement through the passage 156. The conditioned cut crop then moves to an exit 158 where it is deposited in the field, as previously described.

While exemplary embodiments incorporating the principles of the present invention have been disclosed herein, the present disclosure is not limited to the disclosed embodiments. Instead, this application is intended to cover any variations, uses, or adaptations of the disclosure using its general principles. For instance in other embodiments, the undershot rotating element is used with other types of converging means to direct the cut crop to a middle portion of the mower conditioner. In another embodiment, the overshot rotating element is located directly behind the undershot rotating element or behind and below the undershot rotating element to move cut crop into the conditioner. One or both of the undershot and overshot rotating elements, in different embodiments, extends nearly the full distance of the cutterbar to eliminate some or all of the drums typically found on the outer ends of rotary cutter of the cutterbars. In still other embodiments, the undershot rotating element is positioned between converging drums located at the ends of the cutterbar. Likewise, the undershot rotating elements could be used on machines without a conditioner for crops which do not require conditioning. Consequently as described herein, the crop harvesting machine reduces the amount of recutting and non-uniform feeding found in other machines. In particular, locating the rotational axis of the undershot rotating element above the cutterbar provides additional advantages such as better cut quality and improved capacity in challenging crop conditions and more uniform crop placement in the swath resulting in improved drydown. Further, this application is intended to cover such departures from the present disclosure as come within known or customary practice in the art to which this invention pertains.

The invention claimed is:

1. A crop harvesting machine configured to cut crop material and to transfer the cut crop material, the crop harvesting machine comprising:
   a cutterbar supported by a frame, the cutterbar including a plurality of rotary cutters disposed along an axis which is transverse to a forward working direction of the crop harvesting machine, each of the plurality of rotary cutters includes at least one rotary cutter knife mounted thereto, each of the rotary cutter knives defining a leading edge at which the crop is cut by the rotary cutter knives, and a trailing edge spaced from the leading edge along the working direction and disposed toward the rearward location of the frame, a sequence of adjacent rotational centerlines of the rotary cutters defines a rotary cutter longitudinal zone, wherein each of the rotary cutters includes an inclined leading portion extending downwardly relative to and away from the rotational centerline thereof towards the leading edge, further wherein each of the rotary cutters includes an inclined trailing portion extending downwardly relative to and away from the rotational centerline thereof towards the trailing edge;

an undershot rotating element supported by the frame for rotation about a rotational axis, wherein the rotational axis of the undershot rotating element is located above at least a portion of the cutterbar and the rotational axis is further disposed between the rotary cutter longitudinal zone and the trailing edge, the undershot rotating element is located above the inclined trailing portions of the plurality of rotary cutters, the undershot rotating element is configured to rotate about the rotational axis to move cut crop material between the undershot rotating element and the plurality of rotary cutters; and an overshot rotating element supported by the frame for rotation about a rotational axis wherein the rotational direction of the overshot rotating element is in a direction opposite to the rotational direction of the undershot rotating element, the undershot rotating element being spaced apart from and forward of the overshot rotating element as measured along a longitudinal axis of the crop harvesting machine such that a rear edge of the undershot rotating element is spaced apart from and forward of a forward edge of the overshot rotating element to provide a path for the cut crop between the undershot rotating element and the overshot rotating element.

2. The crop harvesting machine of claim 1 wherein the undershot rotating element is floatingly supported above the rotary cutters such that the undershot rotating element is configured to move toward or away from the rotary cutters as a function of the amount of cut crop moving between the undershot rotating element and the rotary cutters.

3. The crop harvesting machine of claim 1 wherein the undershot rotating element includes a first flighting disposed toward a first end of the undershot rotating element, a second fighting disposed toward a second end of the undershot rotating element, and a plurality of paddles disposed between the first flighting and the second flighting.

4. The crop harvesting machine of claim 2 wherein the undershot rotating element includes a first flighting disposed toward a first end of the undershot rotating element, a second fighting disposed toward a second end of the undershot rotating element, and a plurality of paddles disposed between the first flighting and the second flighting.

5. The crop harvesting machine of claim 1 further comprising a first converging drum disposed at one end of the cutterbar and a second converging drum disposed at another end of the cutterbar, wherein each of the first converging drum and second converging drum rotate in opposite directions and toward a center of the cutting bar.

6. The crop harvesting machine of claim 1 further comprising a conditioner element configured to condition the cut crop material wherein the conditioner element is supported by the frame along an axis transverse to the working direction and at a rearward location of the frame with respect to the working direction.

7. The crop harvesting machine of claim 6 wherein the conditioner element includes a first conditioner roll supported by the frame for rotation about a first conditioner roll axis and a second conditioner roll supported by the frame for rotation about a second conditioner roll axis, wherein the first conditioner roll and the second conditioner roll are configured to rotate in opposite directions about each of the respective conditioner roll axis.

8. The crop harvesting machine of claim 7 further comprising a first converging drum disposed at one end of the cutterbar and a second converging drum disposed at another end of the cutterbar, wherein each of the first converging drum and second converging drum rotate in opposite directions and toward a center of the cutting bar.

9. The crop harvesting machine of claim 7 wherein the plurality of rotary cutters defines a cutting width, the undershot rotating element defines an undershot rotating element working distance less than the first cutting width, and the first conditioner roll and the second conditioner roll defines a conditioner working distance less than the undershot rotating element working distance.

10. The crop harvesting machine of claim 9 wherein each of the undershot rotating element and the overshot rotating element includes a first flighting disposed toward a first end of the undershot rotating element or overshot rotating element, a second flighting disposed toward a second end of the undershot rotating element or overshot rotating element, and a plurality of paddles disposed between the first flighting and the second flighting.

11. The crop harvesting machine of claim 10 wherein the undershot rotating element and the overshot rotating element includes a substantially similar configuration with respect to the size and shape of the first flighting, the second flighting and the plurality of paddles.

12. The crop harvesting machine of claim 11 wherein each of the first and second conditioner rolls includes a plurality of splines.

13. The crop harvesting machine of claim 12 wherein a distance between ends of the paddles of the undershot rotating element and the overshot rotating element along the rotational axis thereof is less than a distance between ends of the splines of the first and second conditioners.

14. A method of cutting and conditioning a crop and for returning the cut and conditioned crop to a field in a swath, the method comprising:

providing a crop harvesting machine including: i) an input and an output, the input configured to receive a crop and the output configured to deliver a conditioned cut crop to the field; ii) a cutterbar including a plurality of rotary cutters defining a front cutting edge located toward the input and a trailing edge displaced from the front cutting edge, the plurality of rotary cutters having a rotational centerline disposed between the front cutting edge and the trailing edge, wherein each of the rotary cutters includes an inclined leading portion extending downwardly relative to and away from the rotational centerline thereof towards the front cutting edge, each of the rotary cutters includes an inclined trailing portion extending downwardly relative to and away from the rotational centerline thereof towards the trailing edge; ii) an undershot rotating element having a rotational axis located above at least a portion of the plurality of rotary cutters, the rotational axis of the undershot rotating element located above the inclined trailing portions of the plurality of rotary cutters, the rotational axis of the undershot rotating element being located between the rotational centerline and the trailing edge; iii) an overshot rotating element having a rotational axis wherein the rotational direction of the overshot rotating element is in a direction opposite to the rotational direction of the undershot rotating element, the undershot rotating element being spaced apart from and forward of the overshot rotating element as measured along a longitudinal axis of the crop harvesting machine such that a rear edge of the undershot rotating element is spaced apart from and forward of a forward edge of the overshot rotating element to provide a path for the cut crop between the undershot rotating element and the overshot rotating element and iv) a rotary conditioner element disposed between the trailing edge and the output;

cutting the crop with the rotary cutters;

delivering the cut crop to an area located between the undershot rotating element and the plurality of rotary cutters;

rotating the undershot rotating element in a first direction to move the cut crop into contact with the plurality of rotary cutters;

rotating the overshot rotating element in a direction opposite to the first direction of the undershot rotating element to move the cut crop along the path between the undershot rotating element and the overshot rotating element;

rotating the rotary conditioner element in a direction opposite to the first direction of the undershot rotating element to condition the cut crop; and depositing the conditioned cut crop to the field in a swath.

15. The method of claim 14 wherein the providing a rotating conditioner element disposed between the trailing edge and the output includes providing a rotating conditioner element including a first conditioner roll and a second conditioner roll, wherein the first conditioner roll rotates in a direction opposite the rotating direction of the undershot rotating element and the second conditioner roll rotates in a direction the same as the direction of the undershot rotating element.

* * * * *